Dec. 6, 1949 H. SMITH ET AL 2,490,241
GRAIN DISPENSING TRUCK
Filed Aug. 14, 1948 2 Sheets-Sheet 1

Herbert B. Owens
Henry Smith
INVENTORS

BY
ATTORNEY

Dec. 6, 1949 H. SMITH ET AL 2,490,241
GRAIN DISPENSING TRUCK
Filed Aug. 14, 1948 2 Sheets-Sheet 2
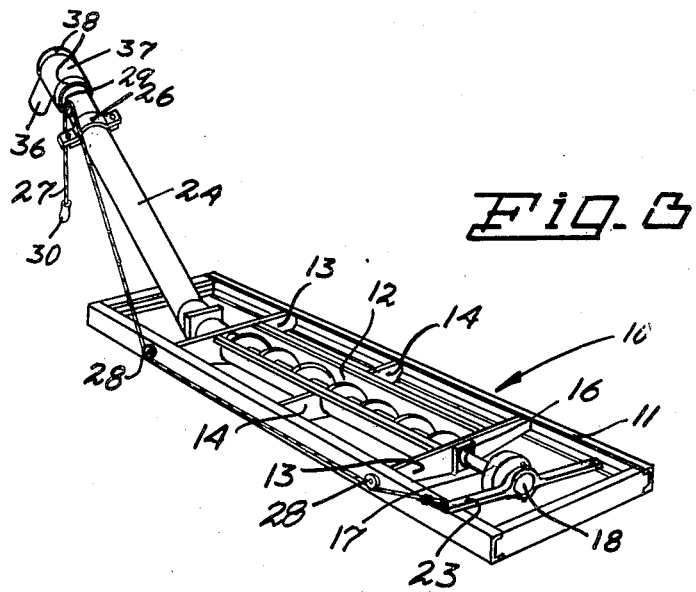
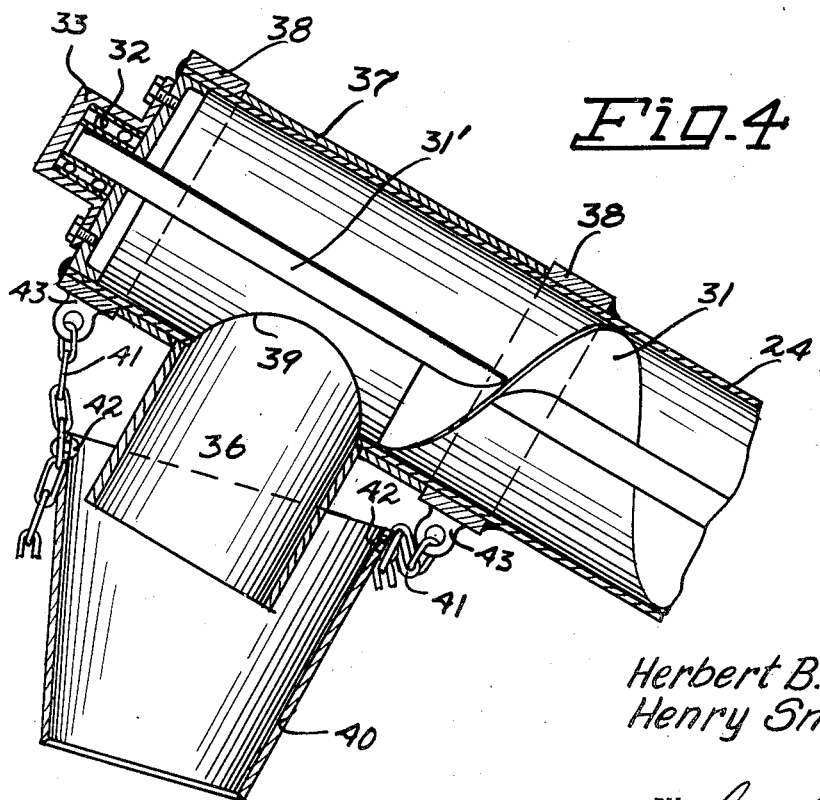
Herbert B. Owens
Henry Smith
INVENTORS
BY Glenn L. Fish
ATTORNEY Patented Dec. 6, 1949

2,490,241

UNITED STATES PATENT OFFICE 2,490,241

GRAIN DISPENSING TRUCK

Henry Smith and Herbert B. Owens,
Kennewick, Wash.

Application August 14, 1948, Serial No. 44,306

4 Claims. (Cl. 214—83.16)

This invention relates to a delivery truck and more particularly to a truck which is intended for transporting grain from an elevator, or other place where it is stored to a field where it is to be used.

At the present time it is customary to purchase seed grain in sacks which are hauled in a truck to a field and the sacks unloaded from the truck at places where it is estimated that a fresh supply of seed will be needed by workmen operating a seeder. This has been found inconvenient as it is often found that the sacks of grain are not near enough to a seeder which requires refilling and in addition this practice makes it necessary to lift the sacks of grain from the truck and pile them upon the ground and again lift the sacks and carry them to the feeder when the grain is to be poured into the feeder.

Therefore one object of the invention is to provide a truck which may be filled with bulk grain and has associated with it a conveyor by means of which grain is removed from the truck body and discharged directly into a seeder.

Another object of the invention is to provide a truck having a conveyor mounted under its body and removable therefrom so that after seeding has been finished the conveyor may be removed and the truck then used for general hauling purposes.

Another object of the invention is to provide a truck with a conveyor having a portion located under the truck body and a spout which extends from the rear end of the truck and at such an incline that grain may be discharged directly from the spout into a seeder.

Another object of the invention is to provide a truck with a conveyor which is driven from the power-takeoff shaft of the truck and is provided with a clutch which is normally inoperative and is rendered operative by means of a pull cord so located that it may be conveniently grasped by a person standing upon the ground back of the truck.

Another object of the invention is to provide a conveyor which is of sturdy construction and not liable to be damaged when subjected to rough use.

The invention is illustrated in the accompanying drawings wherein

Fig. 3 is a perspective view of the removable conveyor of the truck.

Fig. 4 is a sectional view upon an enlarged scale taken longitudinally through the discharge tube of the conveyor.

Figure 1:
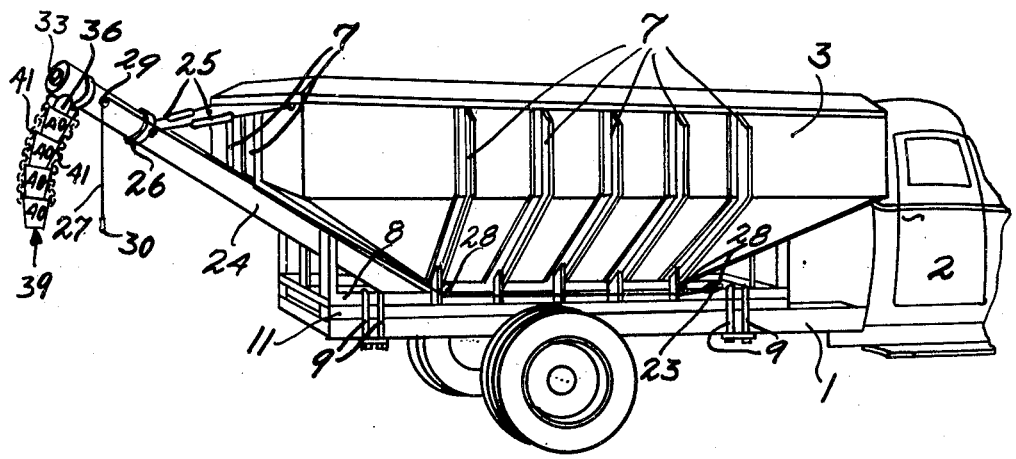
Fig. 1 is a side elevation of the improved grain truck.

This improved grain truck has a chassis 1 of conventional construction provided at its front end with the usual cab 2. A body 3 is disposed over the chassis and has its open top surrounded by an inwardly projecting upwardly inclined flange or rim 4 which serves to prevent bulk grain in the body from spilling over sides or ends of the body when the truck is jolted by passing over rough ground. Walls of the truck converge downwardly to a discharge opening 5 formed through the bottom of the body and bordered by depending flanges along its ends and sides. When a removable closure is applied to the opening 5 the body will have a solid bottom and may be used for general hauling purposes. The body is formed of strong sheet metal and braced by reinforcing ribs 7 and in order to support the body upon the chassis 1 there has been provided a frame 8 which rests upon side bars of the chassis where it is secured by U-bolts 9. Since the body is secured to the chassis by the U-bolts it may be released and a conveyor shown in Figure 3 installed under the body for use or removed when no longer needed.

Figure 2:
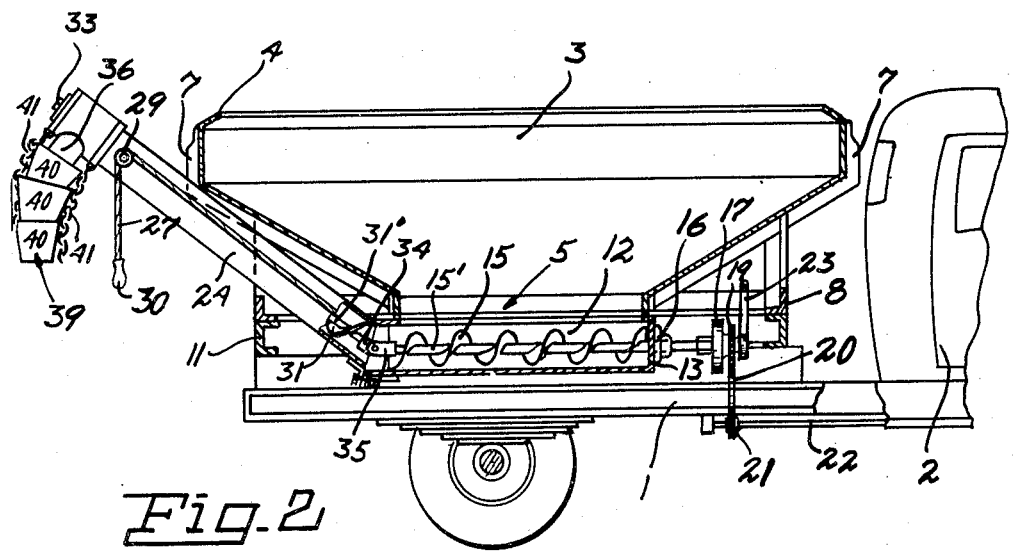
Fig. 2 is a vertical sectional view taken longitudinally through the truck.

The conveyor which is indicated in general by the numeral 10 has a frame 11 formed of channel metal and carrying trough 12 which extends longitudinally in the frame and has its ends connected with cross heads 13 which project from opposite sides of the trough and have their ends secured to side bars of the frame. The rear cross head closes the rear end of the trough and the front end portion of the trough passes through the front cross head as shown in Figure 2. Bracing arms 14 extend from the trough midway the length thereof with their ends secured to the frame and serve to prevent downward sagging of the trough. Additional arms 14 may be provided if so desired. A shaft 15' of a screw conveyor 15 extends longitudinally in the frame midway the width thereof and is journaled through a bearing 16 carried by the rear cross head with a portion projecting rearwardly from the frame and carrying a clutch 17 having a member 18 which is shiftable along the shaft into and out of a clutching position. A sprocket wheel 19 is carried by the shiftable clutch member and about this sprocket wheel is trained a chain 20 which extends downwardly from the shaft 15 and has its lower portion trained about a sprocket wheel 21 carried by the shaft 22 leading from the power takeoff of the truck engine.

An operating handle 23 for the clutch member 18 extends transversely of the frame 11 with one end pivoted to a side bar of the frame, and from an inspection of Figures 2 and 3 it will be seen that the handle or lever extends at an upward incline across the frame with its free end portion projecting laterally from the frame. By swinging the lever longitudinally of the frame 11 the clutch member 18 may be moved into and out of clutching engagement with the clutch 17 and rotation of the conveyor shaft controlled. It will thus be seen that during use of the truck the body may be filled with seed grain which flows through the outlet at the bottom of the body and fills the trough 12 and when rotary motion is transmitted to the screw conveyor the grain will be moved towards the rear end of the conveyor trough and into the lower end of a tubular spout 24 which extends from the rear end of the trough and at an upward incline beyond the rear end of the frame 11 and the truck body where it is supported by bracing rods 25 which are of the turnbuckle type and have their rear ends connected with a collar 26 about the tube or pipe 24 and their front ends detachably connected with the rear end of the truck body. The rope or line 27 by means of which the lever 23 is operated extends forwardly from the lever in engagement with guide pulleys 28 at one side of the conveyor frame, the rope being then extended upwardly along the pipe or tube 24 and engaged with a guide pulley 29 on the pipe and its free end portion extending downwardly therefrom and carrying a hand grip 30 by means of which it may be readily grasped and pull exerted to swing the lever forwardly and cause rotation of the screw conveyor. Normally the lever remains in a position rendering the screw conveyor inoperative. A screw conveyor 31 extends longitudinally through the pipe 24 and has the upper or outer end of its shaft 31' rotatably mounted in a bearing 32 carried by the cap 33 closing the outer end of the pipe and its rear or lower mounted through a bearing 34 and connected with the front end of the shaft 15' of the screw conveyor 15 by a universal joint 35. Grain which is carried upwardly through the pipe 24 flows outwardly therefrom through a spout or nozzle 36 carried by a sleeve 37 which is rotatably mounted about the pipe between collars 38 carried by the pipe. By turning the sleeve about the pipe out of a position in which it registers with the opening 39 in the pipe unintentional discharge of grain from the pipe may be prevented while the truck is being moved from one place to another. Grain which flows from the spout 36 enters a flexible spout 39 by means of which the grain is delivered into the seed box of a seeder. This flexible spout is formed of a number of sections 40 which are of inverted frustro conical formation and suspended one above another by chains 41 which have certain of their links engaged with headed pins 42 of sides of the sections 40 and their upper ends connected with eyes 43 carried by the collars 38. The fact that the sections of the flexible spout are suspended under the spout 36 by chains allows this spout to be moved into and out of position for discharging grain into a seeder and also allows the spout 36 to move into and out of the upper section of the flexible spout when the sleeve 37 is turned about the pipe 24. By releasing the braces 25 and loosening the U-bolts 9 the conveyor may be removed from the truck and the truck body then firmly secured directly upon the chassis and the outlet at the bottom of the truck body then closed by a closure board or plate of suitable dimensions set in place at the top of the outlet 5 so that the truck may be used as a general utility truck.

Having thus described the invention, what is claimed is:

1. In a truck, a chassis, a body over said chassis having an outlet opening in its bottom, a conveyor having a frame removably mounted between the chassis and the body and having side bars resting upon side bars of the chassis, a trough extending longitudinally in said frame midway the width thereof and disposed under the outlet of the body, supports extending laterally from sides of the trough in spaced relation to each other longitudinally thereof and secured at their outer ends to side bars of the frame, a screw conveyor extending longitudinally in said trough and having a shaft rotatably mounted and projecting from the rear end of the trough, means for transmitting rotary motion to said screw conveyor including a clutch upon the conveyor shaft and an operating handle for the clutch extending transversely of the frame, a pipe extending rearwardly from said trough, and a screw-conveyor in said pipe having a shaft rotatably mounted and connected with the shaft of the screw conveyor in the trough.

2. In a truck, a chassis, a body over said chassis having an outlet opening in its bottom, a conveyor having a trough extending longitudinally of said chassis under the outlet of the body, a screw conveyor extending longitudinally in said trough, a pipe extending from the rear end of said trough and having an outlet opening adjacent its rear end, a screw conveyor extending longitudinally in said pipe, a sleeve mounted about said pipe and provided with a spout, said sleeve being rotatable about the pipe to move the spout into and out of registry with the outlet of the pipe, collars about said spout engaging ends of said sleeve and preventing movement of the sleeve longitudinally upon the pipe, and a tube suspended from said collars and disposed under said spout.

3. In a truck, a chassis, a body over said chassis having an outlet opening in its bottom, a conveyor having a frame removably mounted between the chassis and the body, a trough extending longitudinally in said frame under the outlet of the body, supports extending from sides of the trough and secured at their ends to the frame, a screw conveyor extending longitudinally in said trough and having a shaft rotatably mounted and projecting from the rear end of the trough, means for transmitting rotary motion to said screw conveyor including a clutch and operating means for the clutch, a pipe extending from the rear end of said trough in position for disposition over a seed receptacle of a seeder and having an outlet opening adjacent its rear end, a screw conveyor extending longitudinally in said pipe and having its shaft rotatably mounted and coupled to the shaft of the screw conveyor in the trough, a sleeve mounted about said pipe and provided with a spout, said sleeve being rotatable about the pipe to move the spout into and out of position to register with the outlet of the pipe, and a flexible tube extending downwardly from said pipe and into which the spout fits when in registry with the outlet of the pipe.

4. In a truck, a chassis, a body over said chassis having an outlet opening in its bottom, a conveyor having a frame removably mounted between the chassis and the body, a trough extending longitudinally in said frame under the outlet of the body, supports extending from sides of the trough and secured at their ends to the frame, a screw conveyor extending longitudinally in said trough and having a shaft rotatably mounted and projecting from the rear end of the trough, means for transmitting rotary motion to said screw conveyor including a clutch and operating means for the clutch, a pipe extending from the rear end of said trough in position for disposition over a seed receptacle of a seeder and having an outlet opening adjacent its rear end, a screw conveyor extending longitudinally in said pipe and having its shaft rotatably mounted and coupled to the shaft of the screw conveyor in the trough, a sleeve mounted about said pipe and provided with a spout, said sleeve being rotatable about the pipe to move the spout into and out of registry with the outlet of the pipe, collars about said pipe engaging ends of the sleeve and preventing sliding of the sleeve longitudinally upon the pipe, eyes carried by portions of the collars under the pipe, and a flexible tube consisting of sections disposed one above another with their lower ends fitting into upper portions of sections under them and chains extending longitudinally of said flexible tube with certain of their links connected with upper portions of the said sections and their upper ends connected with said eyes.

HENRY SMITH.
HERBERT B. OWENS.

REFERENCES CITED

The following references are of record in the file of this patent:

UNITED STATES PATENTS

| Number | Name | Date |
|---|---|---|
| 1,398,649 | Richards | Nov. 29, 1921 |
| 2,139,417 | Milan | Dec. 6, 1938 |
| 2,147,992 | Schau | Feb. 21, 1939 |
| 2,417,020 | Shugart | Mar. 4, 1947 |
| 2,438,301 | Schulte | Mar. 23, 1948 |
| 2,439,541 | Hall | Apr. 13, 1948 |
| 2,445,886 | Mulligan | July 27, 1948 |
| 2,466,923 | Woodard | Apr. 12, 1949 |
| 2,470,836 | Piper | May 24, 1949 |